3,427,068
VEHICLE ROOF STRUCTURE
Albert G. Keahn and Robert Koltvedt, Detroit, Mich., assignors to The Budd Company, Philadelphia, Pa., a corporation of Pennsylvania
Filed Oct. 25, 1967, Ser. No. 677,909
U.S. Cl. 296—137         10 Claims
Int. Cl. B62d 25/06

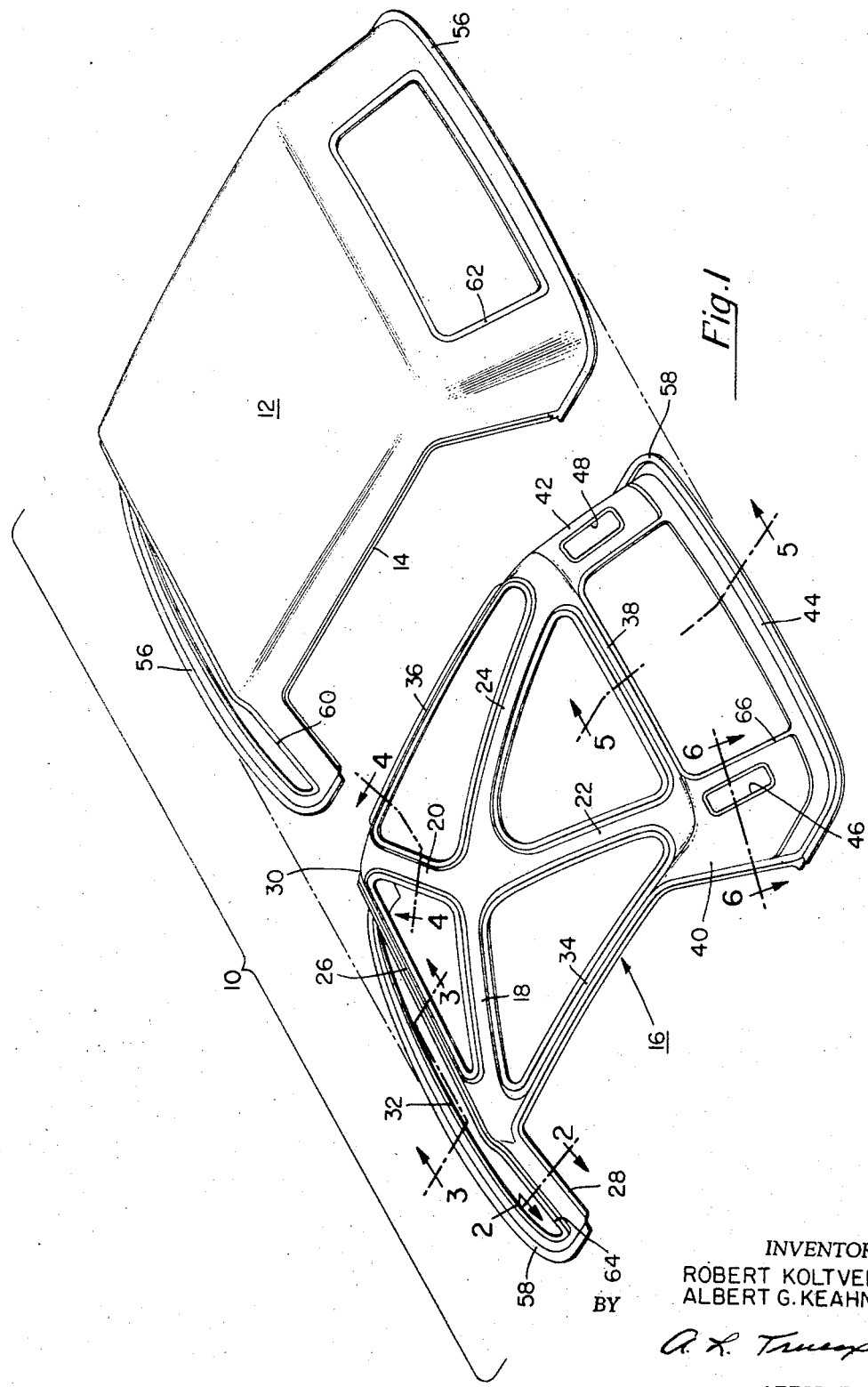

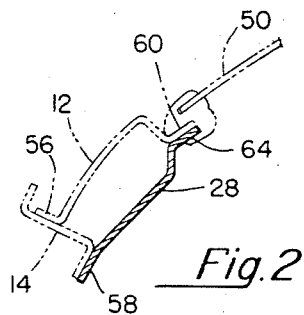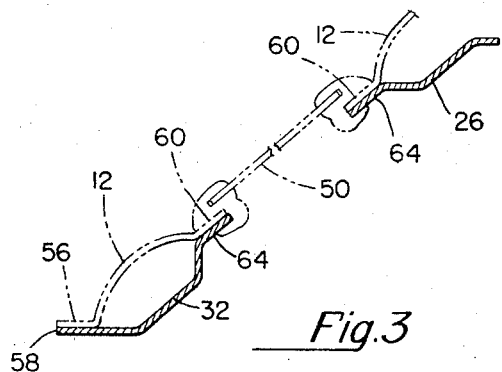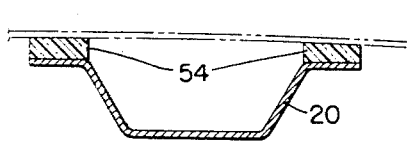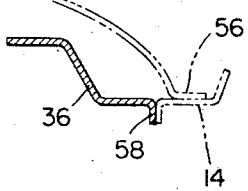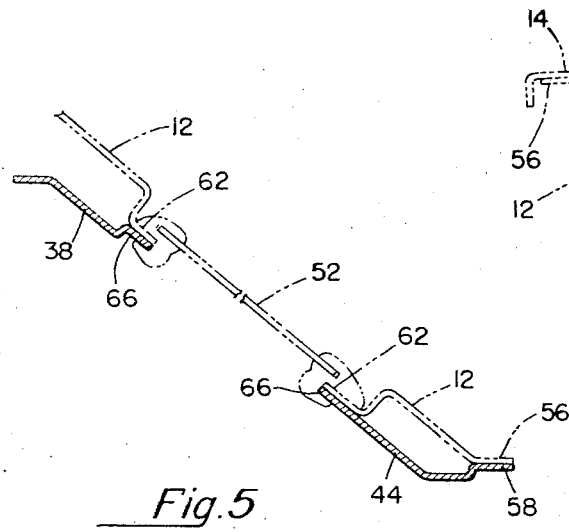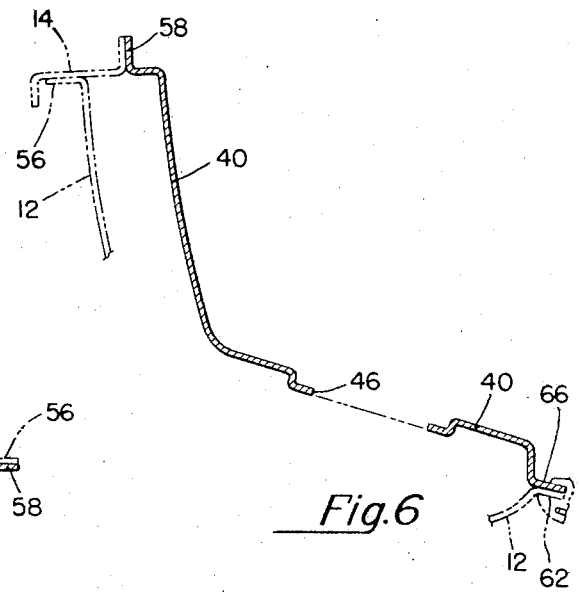
INVENTORS
ROBERT KOLTVEDT
ALBERT G. KEAHN
ATTORNEY

United States Patent Office 3,427,068
Patented Feb. 11, 1969

ABSTRACT OF THE DISCLOSURE

A reinforced roof structure for use on "hardtop" model vehicles in which the front door lock pillars do not extend above the belt line of the vehicle. The reinforcement structure consists of a single stamping with sections blanked out to reduce weight and having formed sections therein for added strength.

---

This invention relates to a vehicle roof structure and more particularly to a stamped reinforcing member joined to a conventional roof panel for increased strength of the complete structure.

The increased use of the "hardtop" model vehicle by the automotive industry in which the front door lock pillar that normally supports each side of the roof structure terminates at the belt line of the vehicle has created a problem of providing sufficient strength in the roof structure to withstand "roll-overs" during accidents. The increased emphasis on the safety of automotive vehicles has tended to compound the problem.

It is an object of this invention to provide a stronger roof structure for use particularly on "hardtop" model vehicles but not necessarily limited to such a use.

Another object of this invention is to provide a single stamping for reinforcing a conventional roof panel and increasing the strength of the combined structure.

These and other objects of this invention will become more evident as reference is made to the following specification and drawings.

FIG. 1 is an exploded isometric view of the novel roof structure illustrating a conventional roof panel and the novel reinforcing roof inner panel.

FIGS. 2 through 6 show various cross-sections of the roof inner panel in solid lines with the adjacent roof panel, drip molding, windshield and backlight shown in phantom lines.

FIG. 2 is a cross-sectional view substantially along line 2—2 of FIG. 1, in the direction of the arrows, showing the A post structure.

FIG. 3 is a cross-sectional view substantially along line 3—3 of FIG. 1, in the direction of the arrows, showing the windshield header and lower windshield support portions of the roof inner panel.

FIG. 4 is a cross-sectional view substantially along line 4—4 of FIG. 1, in the direction of the arrows, showing how the X braces of the roof inner panel are spaced from the roof panel with sound deadening material placed therebetween and also illustrating the attachment of the roof drip molding to the roof panel and roof inner panel.

FIG. 5 is a cross-sectional view substantially along the line 5—5 of FIG. 1, in the direction of the arrows, showing the upper and lower backlight reinforcement sections.

FIG. 6 is a cross-sectional view substantially along the line 6—6 of FIG. 1, in the direction of the arrows, showing the rear window side reinforcement and a light or radio speaker opening adjacent the backlight side frame.

A safety test for the roof structure of vehicle consists of dropping a vehicle in an inverted position on a front corner of the roof to test a vehicle for roll-over roof strength during an accident. This test is very severe on "hardtop" model vehicles, since the front door lock pillar has been removed above the belt line and no longer supports the roof, the roof panel and reinforcing inner panel must be stronger to take the same load without this support. The X brace, header, A post, and side rail structure of the one piece reinforcing inner panel of this invention absorbs the impact of such a test by diverting portion along each of the reinforcing structures that radiate from the top front corner.

Referring now to the drawings, as best seen in FIG. 1, the novel roof structure 10 includes a conventional roof panel 12 with a roof drip molding 14 welded thereto to provide the outer portion of the roof structure.

The reinforcing inner roof panel 16 consists of a single stamping having a central X type portion with the respective arms 18, 20, 22 and 24 extending to each of the top corners of the roof structure. As can be seen in FIG. 1, the arms 18, 20, 22 and 24 are formed as hat sections for increased strength.

The ends of arms 18, 20 are connected by the generally Z-shaped windshield header 26. Extending downwardly at each side of the roof structure from the juncture of arms 18, 20 and windshield header 26 are A post inner panels 28, 30. The bottoms of the A post inner panels 28, 30 are connected by the lower windshield support 32. The ends of arms 18 and 22 and arms 20 and 24 are joined by roof side rails 34 and 36, respectively.

The ends of arms 22, 24 are joined by the backlight header 38. Extending downwardly on each side of the roof structure from the juncture of side rails 34, 36 with arms 22, 24 and backlight header 38 are the rear window reinforcements or "ear muffs" 40, 42, respectively. Extending between the lower end of ear muffs 40, 42 is the backlight lower reinforcement 44.

Apertures 46, 48 are formed in the respective ear muffs 40, 42 for weight reduction and to provide openings in the roof structure for radio speakers or utility lights.

As can be best seen in FIG. 1, the header 26, A post inner panels 28, 30 and lower windshield support 32 define an opening for receiving the windshield 50 shown in phantom lines in FIG. 2 and FIG. 3. The backlight 52 is positioned in the opening defined by the backlight header 38, blacklight lower reinforcement 44 and the ear muffs 40, 42.

The roof panel 12 is joined to the inner roof panel 16 by the welding of a plurality of parallel adjacent flanges to each other. The roof X brace of arms 18, 20, 22, 24 is not secured to the roof panel 12 but is spaced therefrom by a resilient spacer 54 which deadens vibratory noises and allows relative movement between the two panels between the secured edge flanges.

The roof panel 12 is provided with an external dependent flange 56. As best seen in FIGS. 1, 2, 4 and 6, the flange 56 is welded to the roof drip molding about the side door opening. An external depending flange 58 of the inner roof panel is welded to the parallel adjacent external flange 56 and roof drip molding 14 of the roof panel to secure the outer edges of the two panels together.

The roof panel has a pair of internal flanges 60, 62, flange 60 extending about the windshield opening and flange 62 extending about the backlight opening. The inner panel has a pair of flanges 64, 66 that are parallel and adjacent the respective flanges 60, 62 of the roof panel. The flanges 60, 64 about the windshield are welded together to provide a mounting flange for the windshield and flanges 62, 66 are welded together to provide a mounting flange for the backlight.

Thus it can be seen that a shock force applied to one of the upper corners of the roof will be absorbed by the roof structure in four directions: (1) in the vertical plane by either the A post or the rear window side reinforcement, (2) along the roof rail, (3) across the windshield header or backlight header, and (4) diagonally across the roof along one of the arms of the X brace; as well as the resistance supplied by the solid roof panel.

A stronger roof is provided to protect occupants of automobiles with this type construction. The assembly costs are reduced since the roof is constructed of only two stampings plus the roof drip moldings.

While but one embodiment of this invention has been shown and described, variations and modifications of this structure may be made without departing from the scope of the following claims.

We claim:
1. In a vehicle body, a generally rectangular roof structure comprising: a unitary outer roof panel, and a unitary inner roof panel adjacent to said outer roof panel for reinforcing said outer roof panel by being attached thereto; said outer roof panel including a first front aperture for receiving a windshield, a second rear aperture for receiving a backlight, a first internal flange formed about said first aperture and a second internal flange formed about said second aperture, an outer panel external flange, a substantially flat central section, a front depending portion extending about said first aperture and a rear depending portion extending about said second aperture; said inner roof panel including a third aperture co-extensive with said first aperture, a fourth aperture co-extensive with said second aperture, a third internal flange formed about said third aperture, a fourth internal flange formed about said fourth aperture and an inner panel external flange; said first flange and said third flange being co-extensive and secured together for forming an aperture for receiving a windshield, said second flange and said fourth flange being co-extensive and secured together for forming an aperture for receiving a backlight, and said outer panel external flange being connected to said inner panel external flange, whereby said panels are secured together by the connection of the adjacent flanges.

2. The roof structure as claimed in claim 1 including a pair of roof drip moldings secured to said outer panel external flange along opposite sides thereof between said depending portions, and said roof drip moldings being secured to said inner panel external flange adjacent said outer panel between said depending portions for connecting said outer panel to said inner panel between said depending portions.

3. The roof structure as claimed in claim 2 wherein said inner panel flanges are connected to said outer panel flanges and the remainder of said panels are positioned adjacent to each other in a spaced relationship.

4. The roof structure as claimed in claim 3 including a plurality of resilient members positioned between said panels for maintaining the spaced relationship therebetween and reducing vibration noises.

5. The roof structure as claimed in claim 2 wherein said inner panel includes an X brace centrally located therein and said X brace having an arm thereof extending to each of the corners of said roof structure.

6. The roof structure as claimed in claim 2 wherein said inner panel includes an X brace centrally located therein, said X brace having an arm thereof extending to each of the corners of said roof structure, a front cross-header extending between the two front arms of said X brace for forming the upper side of said third aperture and providing front lateral support for said roof structure, a lower windshield support extending between the front ends of said X brace arms and forming the lower side of said third aperture, and a portion of each of the front arms of said X brace extending between said front cross-header and said lower windshield support forming the sides of said third aperture and the upper A posts of said vehicle body.

7. The roof structure as claimed in claim 2 wherein said inner panel includes an X brace centrally located therein, said X brace having an arm thereof extending to each of the corners of said roof structure, a rear cross-header extending between the two rear arms of said X brace for forming the upper side of said fourth aperture and providing lateral support for said roof structure, a lower backlight support extending between the rear ends of said X brace arms and forming the lower side of said fourth aperture, and a portion of each of the rear arms of said X brace extending between said rear cross-header and said lower backlight support forming the sides of said fourth aperture and the rear window side reinforcements of said vehicle body.

8. The roof structure as claimed in claim 7 including at least one of said X brace arms having a fifth aperture formed in the rear window side reinforcement portion for receiving an accessory therein.

9. The roof structure as claimed in claim 2 wherein said inner panel includes an X brace centrally located therein, said X brace having an arm thereof extending to each of the corners of said roof structure, a front cross-header extending between the two front arms of said X brace for forming the upper side of said third aperture and providing front lateral support for said roof structure, a lower windshield support extending between the front ends of said X brace arms and forming the lower side of said third aperture, a portion of each of the front arms of said X brace extending between said front cross-header and said lower windshield support forming the sides of said third aperture and the upper A posts of said vehicle body; a rear cross-header extending between the two rear arms of said X brace for forming the upper side of said fourth aperture and providing lateral support for said roof structure, said rear cross-header being substantially parallel to said front cross-header, a lower backlight support extending between the rear ends of said X brace arms and forming the lower side of said fourth aperture, a portion of each of the rear arms of said X brace extending between said rear cross-header and said lower backlight support forming the sides of said fourth aperture and the rear window side reinforcements of said vehicle body; a pair of substantially parallel roof side rails, said roof side rails extending along each side of said inner panel between the juncture of the X brace arms and said front cross-header and the juncture of the X brace arms and said rear cross-header whereby a force applied to any of the juncture points will be resisted by the four members extending from the juncture, the respective cross-header, side rail, and the two portions of the respective X brace arm.

10. The roof structure as claimed in claim 9 including at least one of said X brace arms having a fifth aperture formed in the rear window side reinforcement portion for receiving an accessory therein.

References Cited

UNITED STATES PATENTS 1,952,309  3/1934  Brockway et al. _____ 296—137

LEO FRIAGLIA, *Primary Examiner.*

ROBERT R. SONG, *Assistant Examiner.*